US007880435B2

(12) United States Patent
Ibrahim (10) Patent No.: US 7,880,435 B2
(45) Date of Patent: Feb. 1, 2011

(54) MULTI-BATTERY CHARGER WITH INDIVIDUAL BATTERY BYPASS CONTROL

(75) Inventor: Randolph A. Ibrahim, Sedalia, CO (US)

(73) Assignee: Nexergy, Inc., Columbus, OH (US)

( * ) Notice: Subject to any disclaimer, the term of this patent is extended or adjusted under 35 U.S.C. 154(b) by 708 days.

(21) Appl. No.: 11/775,030

(22) Filed: Jul. 9, 2007

(65) Prior Publication Data

US 2009/0015207 A1    Jan. 15, 2009

(51) Int. Cl.
*H02J 7/00* (2006.01)
(52) U.S. Cl. .................................. 320/122; 320/120
(58) Field of Classification Search .................. 320/122, 320/116, 119, 120, 132
See application file for complete search history.

(56) References Cited

U.S. PATENT DOCUMENTS 7,019,494 B2 * 3/2006 Mikhaylik .................. 320/148

7,557,539 B2 * 7/2009 Takagi et al. ................. 320/122

FOREIGN PATENT DOCUMENTS

JP    2005-137090    * 5/2005

* cited by examiner

*Primary Examiner*—Edward Tso
*Assistant Examiner*—Richard V Muralidar
(74) *Attorney, Agent, or Firm*—Townsend and Townsend and Crew LLP (57) ABSTRACT

The present invention discloses a battery charger and a method for charging a plurality of batteries. The battery charger includes: a current source for supplying a source current which has a charge current portion and a diverted current portion; bypass sections; voltage clamp sections; sense sections; a feedback section for processing information from the sense sections; and a controller for modifying the source current based on the information from the feedback section. Each bypass section is connected to a battery for diverting the diverted current. Each voltage clamp section is connected to the bypass section for clamping a voltage across the battery when the voltage increases to a predetermined level. Each sense section is connected to the bypass section for determining the diverted current and/or the charge current.

21 Claims, 8 Drawing Sheets

MULTI-BATTERY CHARGER WITH INDIVIDUAL BATTERY BYPASS CONTROL

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The present disclosure relates in general to a battery charging apparatus and method, in particular, but not by way of limitation, for a plurality of Lithium Sulfur (LiS) battery cells.

LiS rechargeable batteries provide users with high-energy and light-weight solutions. For example, LiS batteries developed by Sion Power™ Corporation, Tucson Ariz. are reported to be capable of delivering a specific energy of 400 Wh/kg and an energy density of 425 Wh/liter. The specific energy of the LiS battery exceeds that of state-of-the-art Lithium Ion chemistry by a factor of greater than two, while the energy density stands at an equivalent level. That is, a LiS battery provides the same runtime for a portable computer in less than half the weight, or twice the runtime in the same weight while having a volume comparable to a Lithium Ion battery. Another reported advantage of LiS batteries is their ability to work well in very cold weather. Typical applications include unmanned aerial vehicles, military communication systems, rugged notebook computers, tablet personal computers, and portable medical devices.

In a battery charging process, sufficient charge at an appropriate rate is supplied so that the battery can deliver its rated capacity. Overcharge can cause permanent damage to batteries. Even when the degree of overcharge is not so severe, the battery could become unusable well before its expected lifetime has expired. Furthermore, most batteries generate heat as they charge; for some type of batteries, excessive charge can pose a potential fire risk. Conventional heat management involves heat sinking by using, for example, circuit boards with large copper areas, thereby increasing the cost.

When charging a plurality of batteries, the charge capacities of the pack as a whole can be limited by the characteristics of one of its batteries. The first battery to reach charge complete could prevent the others from being charged, for example. Therefore, in general, the optimal battery pack includes "balanced" batteries with nearly the same capacity and state of charge. For this reason, battery packs should be assembled using cells from the same supplier and production lot. Even with that precaution, due to unavoidable variations in chemistry from battery to battery, abnormal conditions could arise from one particular battery in a battery pack.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE PREFERRED EMBODIMENT(S)

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It should be understood that various changes may be made in the function and arrangement of elements without departing from the spirit and scope of the invention as set forth in the appended claims.

Prevention of Battery Overcharge

Figure 1A:
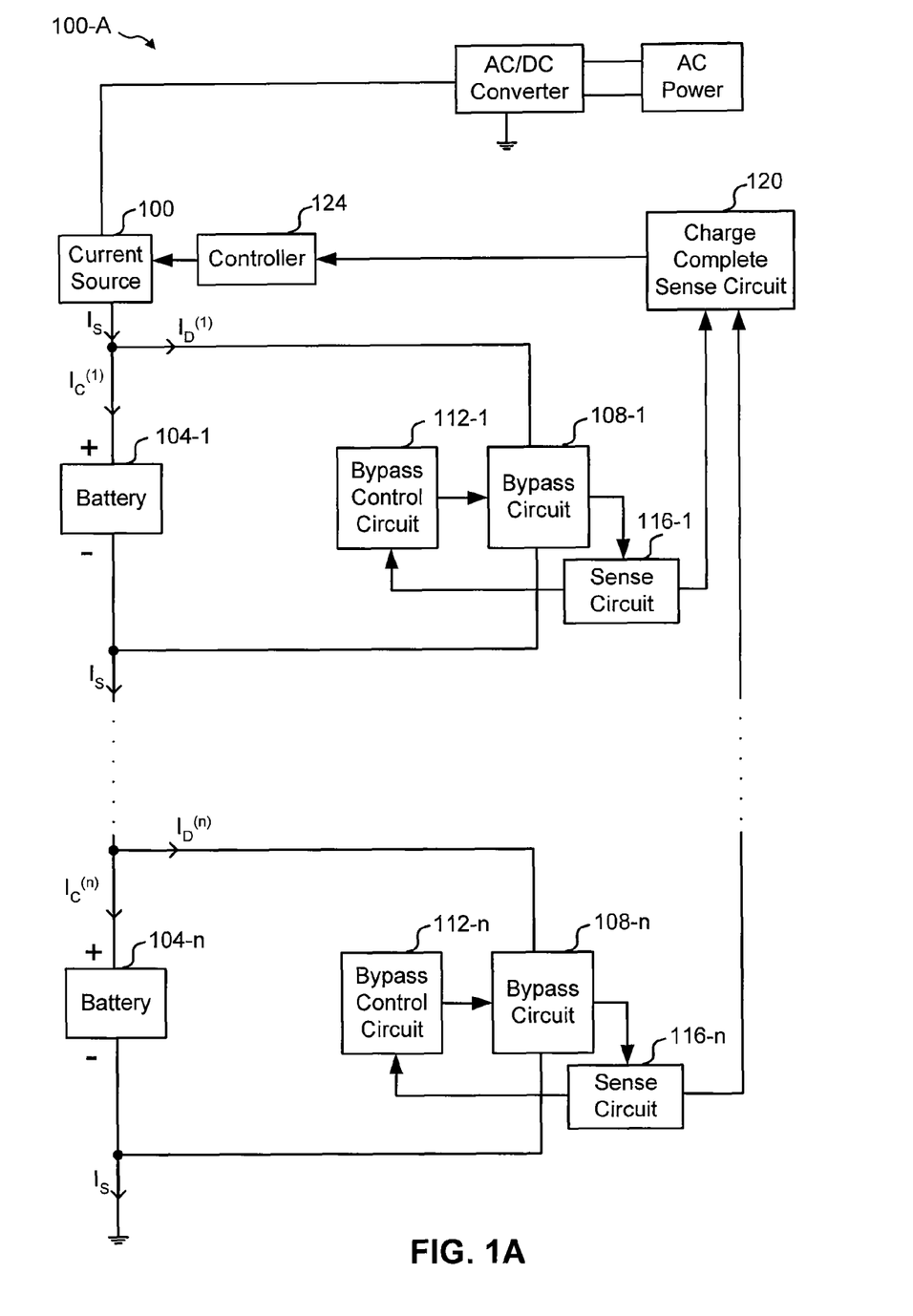
FIG. 1A depicts a block diagram showing a first embodiment of the battery charging system with overcharge prevention scheme.

A first embodiment of the invention incorporates a voltage clamp scheme for bypassing a charge current to prevent overcharge. FIG. 1A is a functional block diagram showing the first embodiment of the battery charging system 100-A according to the present invention. A plurality of batteries 104-1 through 104-n are connected in series, and a current source 100 generates a source current $I_S$ for charging the batteries 104-1 through 104-n. In various embodiments, there could be two, four, eight, sixteen or any number of batteries between two and fifty. As the batteries are charged, the voltage across each battery 104 increases. Once the voltage increases to a predetermined voltage level, a voltage clamp is applied across the battery 104 to prevent voltage run-away and overcharge. To accomplish this, bypass control circuits 112-1 through 112-n are provided for the batteries 104-1 through 104-n, respectively. Further, bypass circuits 108-1 through 108-n are connected in parallel to the batteries 104-1 through 104-n, respectively, each for diverting part or most of the source current $I_S$ from the connected battery 104. In the following, the sub-numerals (−1 . . . −n) are omitted for simplicity when each individual battery and its peripherals are described.

As the voltage is clamped across the battery 104, the charge current $I_C$ in the battery decreases, and unused part of the source current $I_S$ is diverted through the bypass circuit 108, giving rise to the diverted current $I_D$ that passes through the bypass circuit 108. In this embodiment, a sense circuit 116 is connected to the bypass circuit 108 to measure the diverted current $I_D$ to algorithmically obtain the charge current $I_C$. For example, in the case wherein the current source provides a constant source current of 300 mA, the charge current $I_C$ is determined to be 100 mA when the diverted current $I_D$ is measured to be 200 mA.

When the charge current $I_C$ decreases to a predetermined current amount, the clamp voltage is reduced by a predetermined voltage amount to divert the predetermined current amount of the charge current $I_C$ from the battery 104 through the bypass circuit 108. The sense circuit 116 thus senses the maximum source current $I_S$ being diverted through the bypass circuit 108, signaling charge complete of the battery 104. A charge complete sense circuit 120 receives the charge complete signals from the plurality of sense circuits 116-1 through 116-n. Subsequently, a controller 124 turns off the current source 100 upon receiving the information of charge complete of the plurality of batteries from the charge complete sense circuit 120.

Figure 2A:
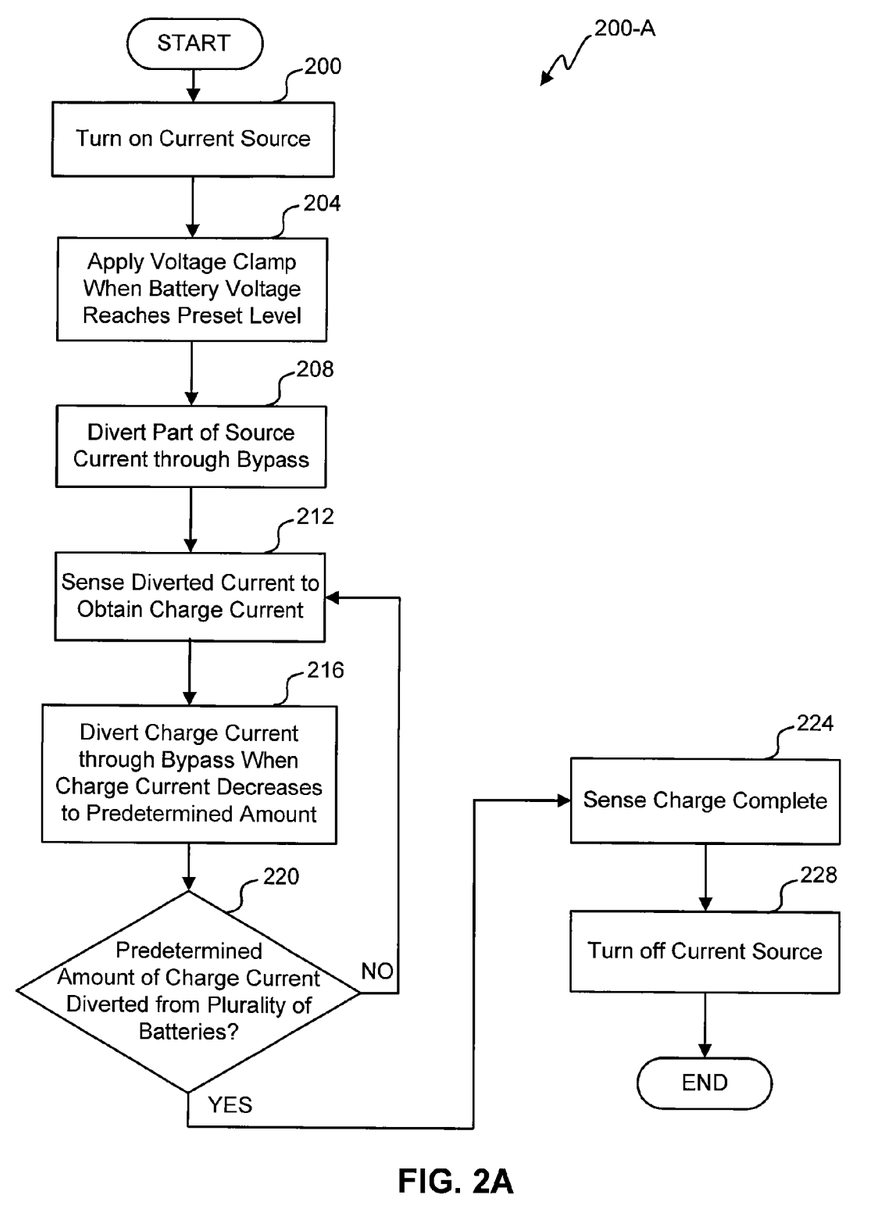
FIG. 2A illustrates a flowchart showing a first embodiment of the battery charging process with overcharge prevention scheme.

FIG. 2A is a flow diagram showing the process 200-A of the first embodiment. The charging process starts with turning on the current source 100 at step 200 for supplying a source current $I_S$ to charge the batteries 104-1 through 104-n. As the batteries are charged, the voltage across each battery 104 increases. Once the voltage increases to a predetermined voltage level, a voltage clamp is applied across the battery 104 at step 204 to prevent voltage run-away and overcharge. The charge current $I_C$ through each battery 104 decreases as the voltage is clamped, and unused part of the source current $I_S$ is diverted through the bypass circuit 108 at step 208, giving rise to the diverted current $I_D$ that passes through the bypass circuit 108. The sense circuit 116 measures the amount of the diverted current $I_D$ at step 212 to allow determining the actual charge current $I_C$ through the battery 104. When the charge current $I_C$ decreases to a predetermined current amount, the clamp voltage is reduced by a predetermined voltage amount to divert the predetermined current amount of the charge current $I_C$ from the battery 104 through the bypass circuit 108 at step 216. This is carried out until the predetermined current amount of the charge current is diverted from each of the plurality of batteries as shown in step 220. The charge complete sense circuit 120 receives the charge complete signals from the plurality of sense circuits 116-1 through 116-n at step 224. Subsequently, at step 228 the controller 124 turns off the current source 100 upon receiving the charge complete indication of the plurality of batteries 104-1 through 104-n from the charge complete sense circuit 120.

Reduction of Power Dissipation in Bypass

In the first embodiment, the current source is turned off after the charge complete of the plurality of batteries. This means that the current source is kept on while a slow charging battery (e.g. 104-n) is still further along in the charge process even though a fast charging battery (e.g. 104-1) has completed charging. In other words, while a finite charge current is still going through the battery 104-n, the maximum source current $I_S$ is being diverted from the battery 104-1 through the bypass circuit 108-1, causing excess power dissipation in the bypass circuit 108-1. A second embodiment of the present invention addresses the issue.

Figure 1B:
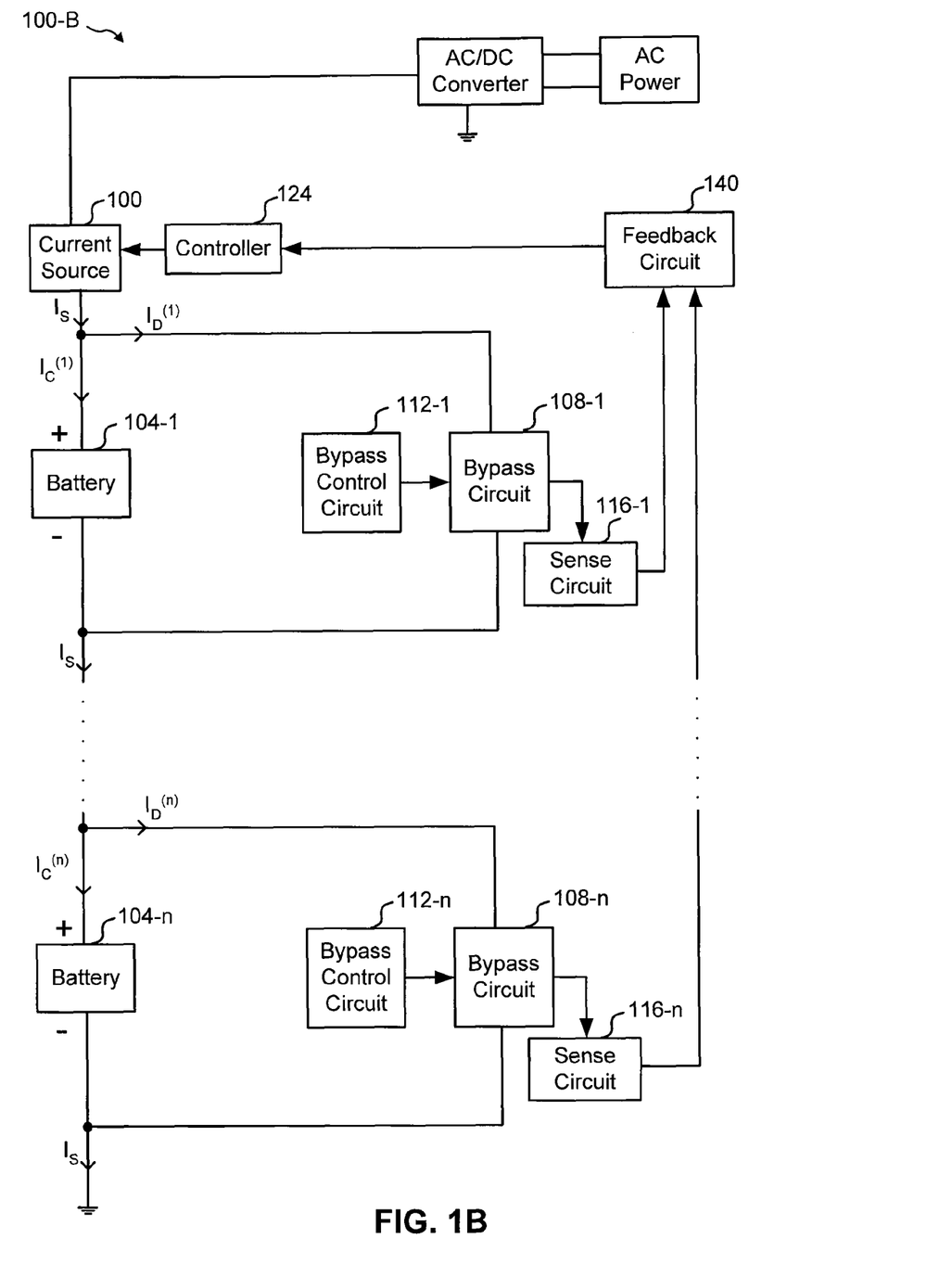
FIG. 1B depicts a block diagram showing a second embodiment of the battery charging system with power dissipation reduction scheme.

FIG. 1B is a functional block diagram showing the second embodiment of the battery charging system 100-B, wherein the charge complete sense circuit 120 in the first embodiment 100-A shown in FIG. 1A is replaced by a feedback circuit 140. The feedback circuit 140 is connected to the plurality of sense circuits 116-1 through 116-n for processing information regarding the charge currents $I_C^{(1)}$ through $I_C^{(n)}$ for the plurality of batteries 104-1 through 104-n, respectively. As the voltage is clamped across each battery 104, the charge current $I_C$ decreases. The charge current $I_C$ decreases fast in a fast charging battery; and it decreases slowly in a slow charging battery. The controller 124 receives the information regarding the charge currents $I_C^{(1)}$ through $I_C^{(n)}$ and reduces the source current $I_S$ to the largest amount of charge current needed by any one of the batteries at each of predetermined time intervals. For example, supposing the current source originally provides a constant source current of 300 mA, when the charge current $I_C^{(1)}$ needed for the battery 104-1 is 200 mA and the charge currents $I_C^{(2)}$ through $I_C^{(n)}$ needed for the respective batteries 104-2 through 104-n are all 150 mA, the source current $I_S$ is reduced to 200 mA in this embodiment. Thus, the diverted current $I_D^{(1)}$ from the battery 104-1 that needs the largest amount of charge current $I_C^{(1)}$ becomes substantially zero, thereby reducing power dissipation in the corresponding bypass circuit 108-1. The diverted current $I_D^{(2)}$ from the battery 104-2, that does not need the largest amount of charge current is still non-zero in the bypass, but is less in the present embodiment (50 mA=200 mA-150 mA) than in the first embodiment (159 mA=300 mA-150 mA) wherein the source current $I_S$ is kept constant (300 mA) until the turn-off. Therefore, the overall power dissipation is further reduced. As the charging proceeds, the largest amount of charge current $I_C$ needed by any one of the batteries 104 decreases and eventually reaches a predetermined charge current threshold, which signifies the charge complete of the plurality of batteries 104-1 through 104-n.

In one embodiment, the source current $I_S$ is reduced to the largest amount of charge current at each of the predetermined time intervals by reducing the source current $I_S$ down until the diverted current $I_D$ in at least one of the bypass circuits 108 is detected to have reached a predetermined diverted current threshold.

Figure 2B:
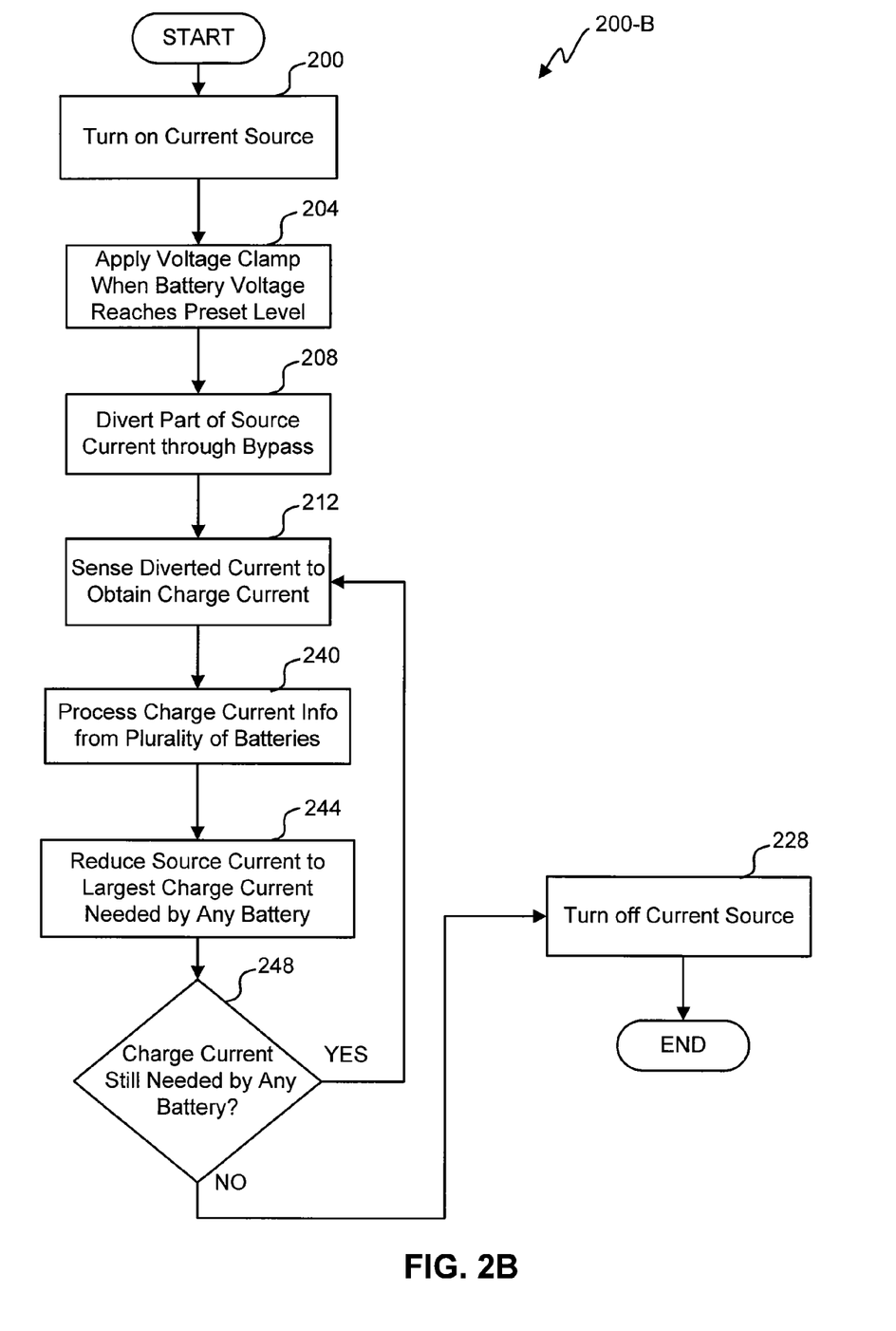
FIG. 2B illustrates a flowchart showing a second embodiment of the battery charging process with power dissipation reduction scheme.

FIG. 2B is a flow diagram showing the process 200-B of the second embodiment. The steps 200-212 are the same as those in the process 200-A of the first embodiment shown in FIG. 2A. At step 240, the feedback circuit 140 processes information regarding the charge currents $I_C^{(1)}$ through $I_C^{(n)}$ for the respective batteries 104-1 through 104-n. Based on the information, at steps 244 and 248 the source current $I_S$ is reduced to the largest amount of charge current $I_C$ needed by any one of the batteries 104 at each of the predetermined time intervals, until the largest amount of charge current needed by any one of the batteries 104 decreases to a predetermined charge current threshold.

Prevention of Battery Overheating

Figure 1C:
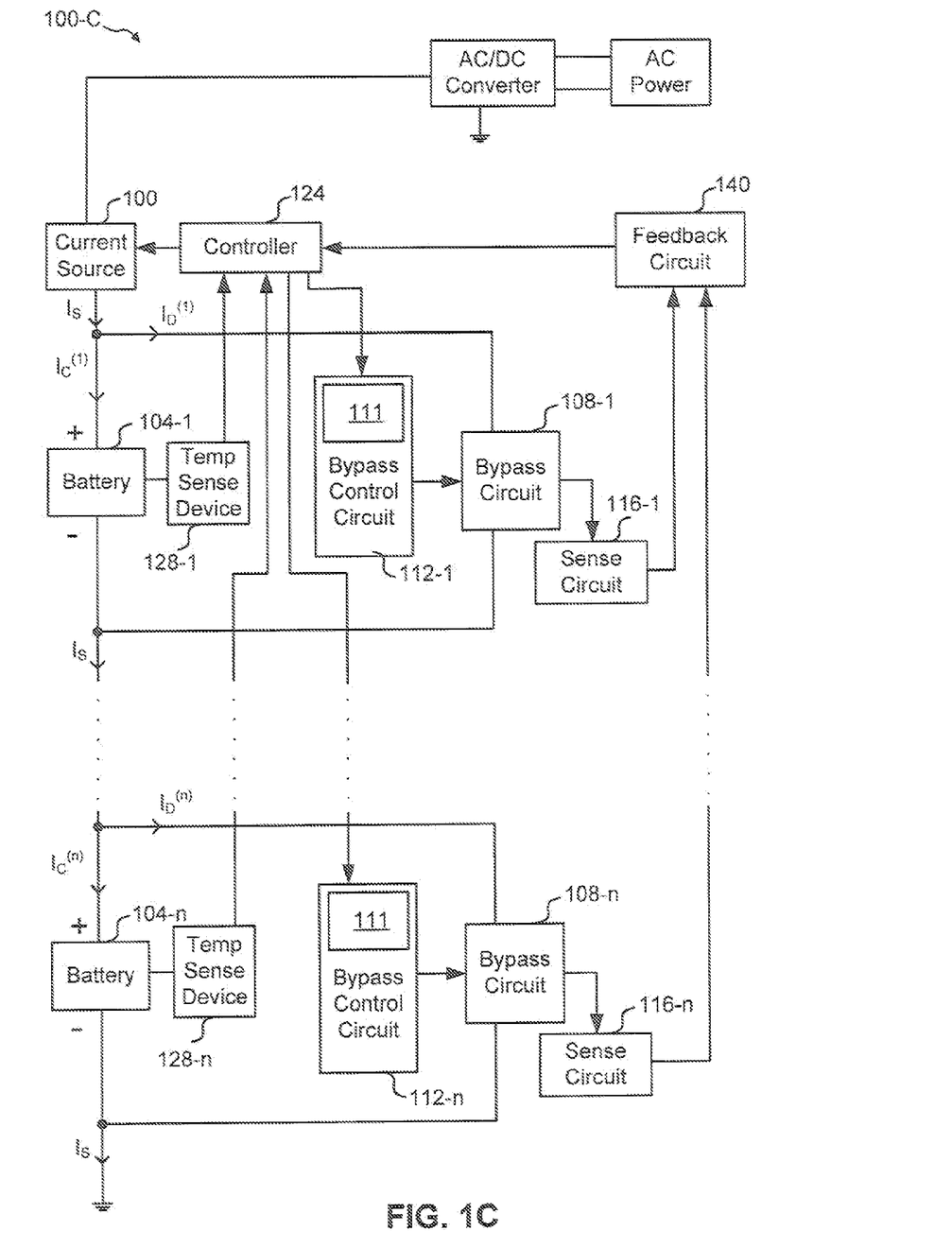
FIG. 1C depicts a block diagram showing a third embodiment of the battery charging system with overheating prevention scheme.

Most batteries generate heat as they charge. A third embodiment of the present invention involves battery-temperature monitoring and application of Pulse Width Modulation (PWM) to the charge current through an affected battery to prevent overheating. FIG. 1C is a functional block diagram showing the third embodiment of the battery charging system 100-C, wherein temperature sensing devices 128-1 through 128-n are added to the second embodiment 100-B shown in FIG. 1B. Each of the temperature sensing devices 128 monitors the temperature of the battery 104 at predetermined time intervals, and sends the information to the controller 124. The time intervals for monitoring the battery temperatures may be the same as or different from the time intervals when the feedback circuit 140 processes information regarding the charge currents $I_C^{(1)}$ through $I_C^{(n)}$ for the respective batteries 104-1 through 104-$n$.

Moreover, in the present embodiment, the bypass control circuit 112 comprises a PWM application section for modulating the charge current $I_C$, which is additional to the voltage clamp section incorporated in the first and second embodiments. The PWM technique is widely known and can be achieved by addition of a few components, and the PWM circuitry may be incorporated in any section as long as the charge current through each battery gets ultimately pulse-width modulated. In one embodiment as indicated in FIG. 1C, the voltage across the battery can be pulse-width modulated to modulate the diverted current $I_D$ through the bypass circuit 108, resulting in the modulation of the charge current $I_C$ through the battery 104. The controller 124, upon receiving the temperature readings from the temperature sensing device 128, obtains a temperature-dependent duty cycle D and accordingly controls the PWM application section 111 in the bypass control circuit 112. In one embodiment, the charge current $I_C$ is pulse-width modulated such that D≠1 (i.e., no modulation) when the temperature is less than a predetermined value, and D≠1 when the temperature is greater than or equal to the predetermined value. The modulation with D≠1 when the temperature is greater than or equal to the predetermined value generates less charge current $I_C$ on average than no modulation, thus reducing the power dissipation and resultant heat in the battery 104, and at the same time prolonging the charge time. Once the temperature decreases to the predetermined value, the duty cycle is switched back to D=1 (i.e., no modulation), so that the maximum charge current passes through the battery 104. Therefore, the PWM modulation prevents the battery overheating with the trade-off of the longer charge time.

The PWM can be realized with or without the feedback circuit 140 for reducing the source current $I_S$ to the largest amount of charge current needed by any one of the batteries, which is incorporated in the second embodiment. In one embodiment with the presence of the feedback circuit 140, the largest amount of charge current needed by any one of the batteries at each of the predetermined time intervals is determined to be the peak current value during on-time of the pulse. In another embodiment with the presence of the feedback circuit 140, it is determined to be the average current value over on-time and off-time of the pulse.

Figure 2C:
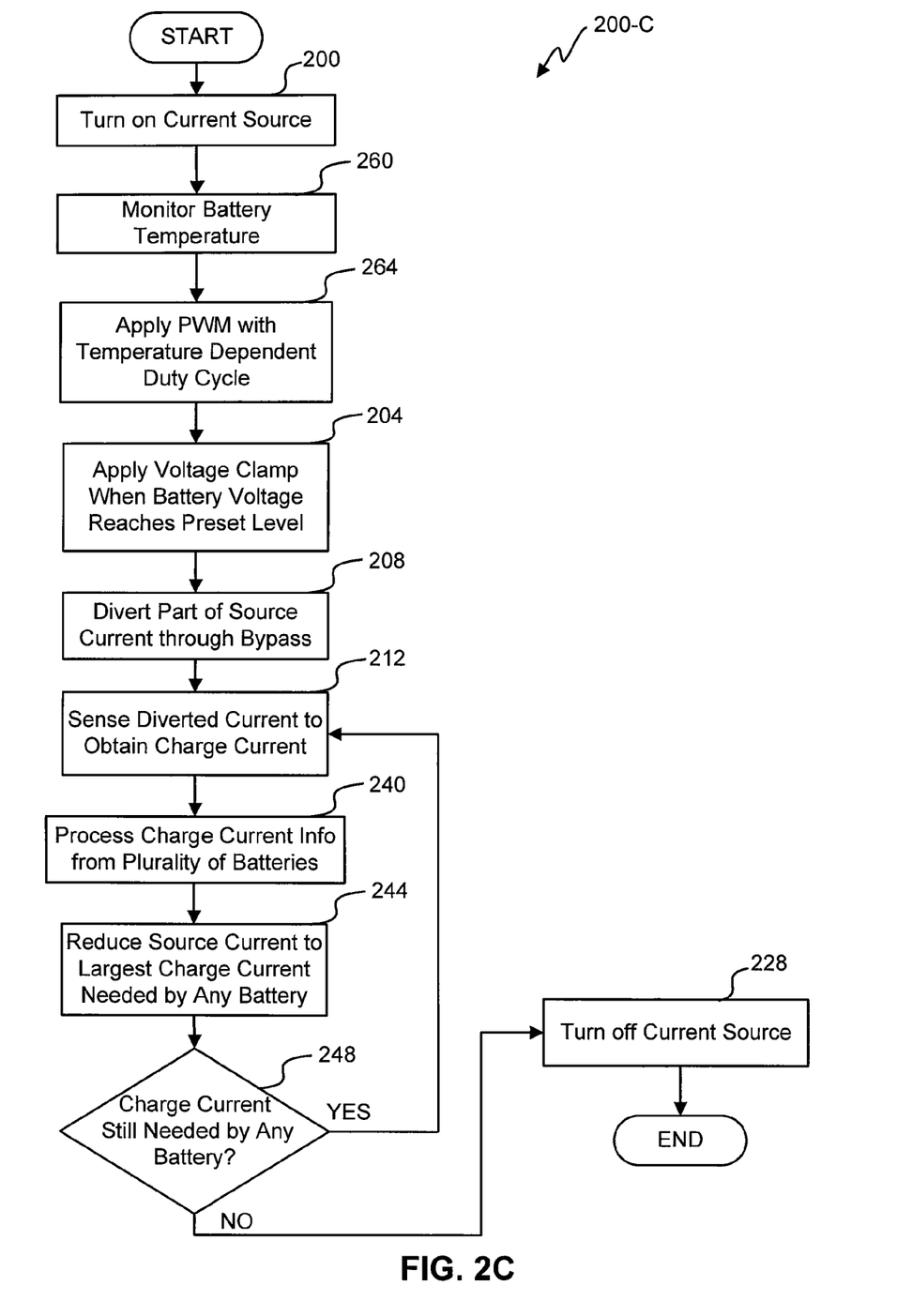
FIG. 2C illustrates a flowchart showing a third embodiment of the battery charging process with overheating prevention scheme.

FIG. 2C is a flow diagram showing the process 200-C of the third embodiment. The steps 200, 204-228 are the same as those in the process 200-B of the second embodiment shown in FIG. 2B. The additional step of monitoring the battery temperature is at step 260, followed by step 264 wherein the pulse-width modulation of the charge current with the temperature-dependent duty cycle D is applied. Note here that these two steps may be carried out independently from the steps of charging the batteries with or without the feedback control of the source current $I_S$. In other words, the temperature sensing device 128, the PWM application section in the bypass control circuit 112 and the controller 124 together may be configured so as to automatically prevent the battery overheating, independently from the charging and feedback mechanisms. For example, as described above, the temperature monitoring and the pulse-width modulation may be left on by only specifying that D=1 (i.e., no modulation) when the temperature is less than the predetermined value, and D≠1 when the temperature is greater than or equal to the predetermined value.

Monitor Battery Conditions

Figure 1D:
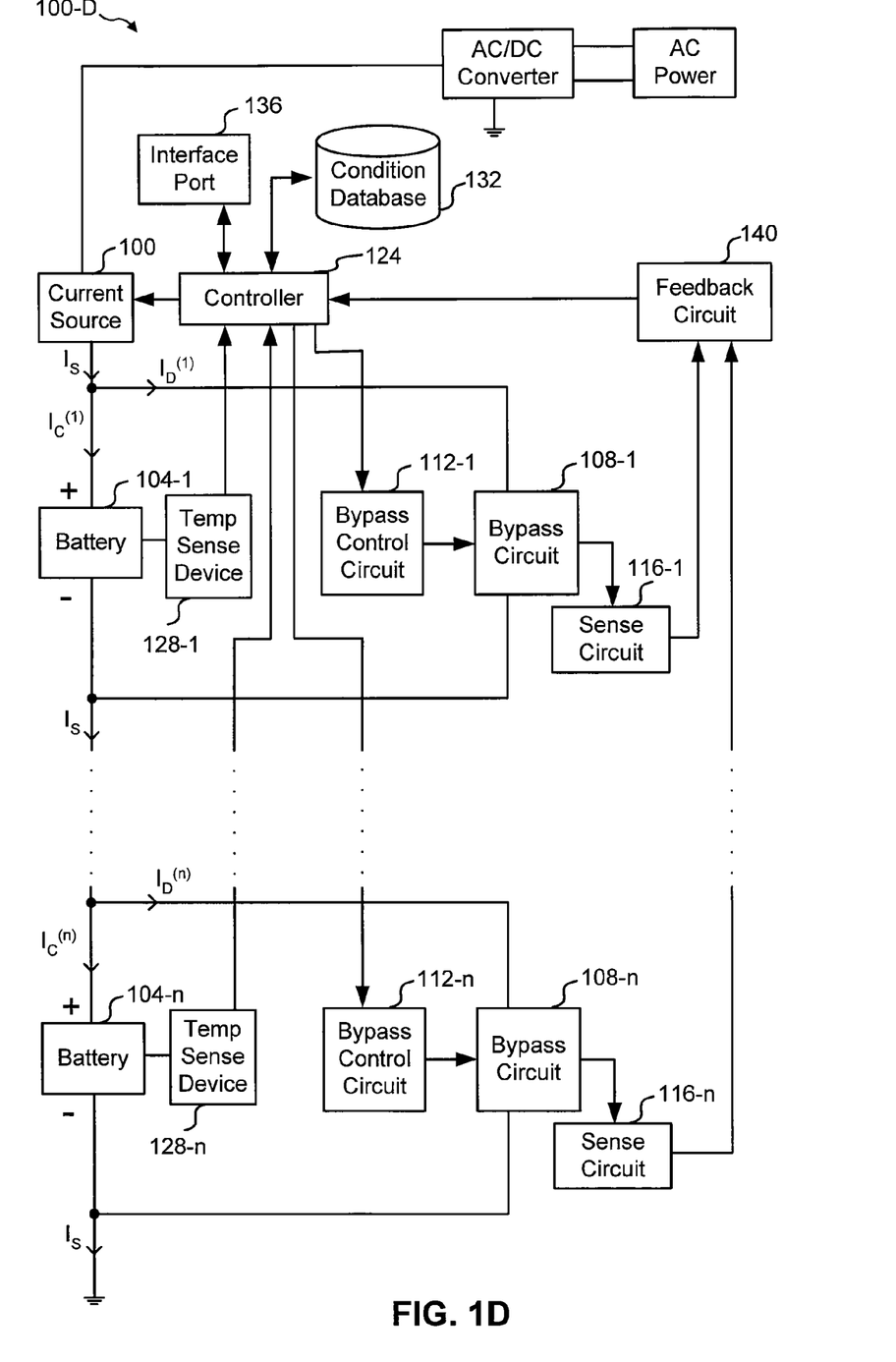
FIG. 1D depicts a block diagram showing a fourth embodiment of the battery charging system with battery monitoring scheme.

Due to unavoidable variations in chemistry from battery to battery, abnormal conditions could arise from one particular battery in a pack, thus destroying "cell-balancing." A fourth embodiment of the present invention allows users to monitor conditions of each battery. FIG. 1D is a functional block diagram showing the fourth embodiment of the battery charging system 100-D, wherein a condition database 132 and an interface port 136 are added to the third embodiment 100-C shown in FIG. 1C. In this embodiment, the temperature readings of each battery 104 at predetermined time intervals, as monitored by the temperature sensing device 128, are sent to the condition database 132 by the controller 124. In addition, the charge time of each battery is determined by detecting the time when the charge current decreases to a predetermined charge current threshold, and is sent to the condition database 132 through the feedback circuit 140 by the controller 124. Users can monitor, via the interface port 136 such as a computer with a screen monitor, the temperature of each battery 104 in real time as well as the individual charge times of the batteries 104-1 through 104-$n$ that have completed charging. The controller 124 retrieves the data from the condition database 132 and sends the data to the interface port 136.

Figure 2D:
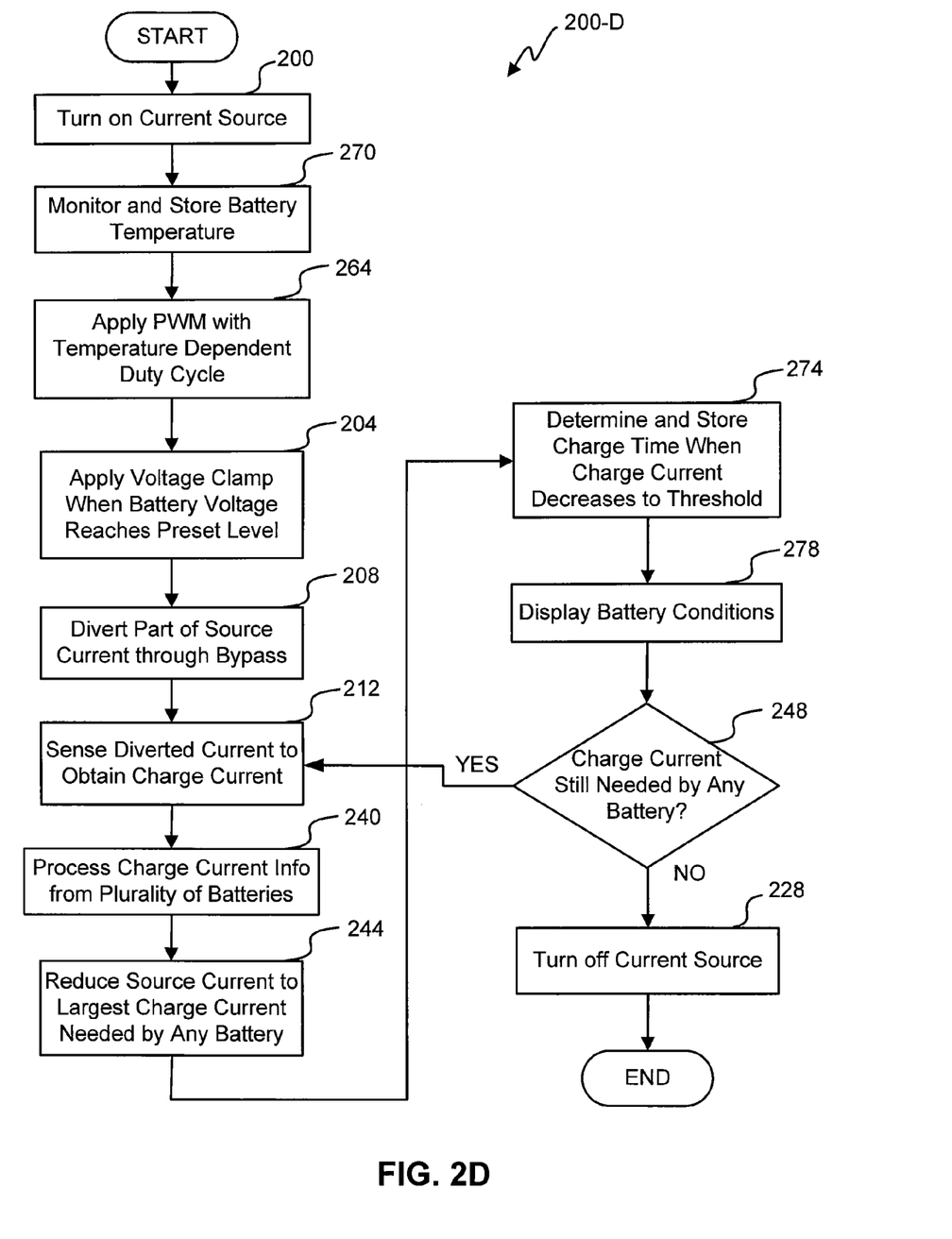
FIG. 2D illustrates a flowchart showing a fourth embodiment of the battery charging process with battery monitoring scheme.

FIG. 2D is a flow diagram showing the process 200-D of the fourth embodiment. At step 270 the temperature of each battery 104 is monitored at predetermined time intervals, and the data is sent to the condition database 132. At step 274, the charge time of each battery is determined by detecting the time when the charge current decreases to a predetermined charge current threshold, and the data is sent to the condition database 132. At step 278, upon receiving the user's request, the controller 124 directs the condition data such as the real-time temperature values of any particular battery or all the batteries, the charge times of any charge complete batteries, etc. to be displayed at the interface port 136.

A number of variations and modifications of the disclosed embodiments may also be used. In one example, instead of determining the charge current by sensing the diverted current using the sense circuit and then subtracting it from the source current, a different circuitry may be implemented to directly measure the charge current through each of the batteries. In another example, although the current source in the present disclosure is assumed to provide a constant source current, it may be variable or modulated. In yet another example, the temperature sensing as given in the third and fourth embodiments may be carried out solely for the purpose of monitoring the temperature of each battery without the PWM application, once it is guaranteed that the batteries don't overheat. In yet another example, although the PWM application section is included in the bypass control circuit in the present disclosure, it may be configured in any way with suitable components as long as the charge current through each of the battery gets pulse-width modulated. Furthermore, features of various embodiments could be mixed and matched. For example, the temperature sensing, the PWM application, the feedback control for reducing the source current, the charge time sensing, and various other functions obtainable through the use of the present invention may be used in any combination thereof, and the circuitry may be simplified accordingly. Additionally, different battery chemistries such as Lithium Ion could be used for the batteries by changing the levels of the voltage clamp, charge current threshold for termination and various other chemistry-specific parameters. Any battery with voltage run-away could be used.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

While the principles of the disclosure have been described above in connection with specific apparatuses and methods, it is to be clearly understood that this description is made only by way of example and not as limitation on the scope of the invention.

What is claimed is:

1. A battery charger for charging a plurality of batteries, the battery charger comprising:
   a current source for supplying a source current;
   a plurality of bypass sections comprising first and second bypass sections;
   a plurality of sense sections comprising first and second sense sections;
   a feedback section for processing information from the plurality of sense sections; and
   a controller for modifying the source current based on the information from the feedback section,
   wherein:
   the first bypass section is adapted to couple to a first battery for diverting a first diverted current from the source current for clamping voltage across the first battery to a first clamp voltage;
   the second bypass section is adapted to couple to a second battery for diverting a second diverted current from the source current for clamping voltage across the second battery to a second clamp voltage;
   the first sense section is coupled to the first bypass section for determining at least one of the first diverted current and a first charge current coupled to the first battery;
   the second sense section is coupled to the second bypass section for determining at least one of the second diverted current and a second charge current coupled to the second battery;
   a plurality of temperature monitoring devices, wherein
   a first temperature monitoring device monitors a first temperature of the first battery at first predetermined time intervals, and
   a second temperature monitoring device monitors a second temperature of the second battery at second predetermined time intervals; and
   a plurality of PWM application sections for applying Pulse Width Modulation (PWM), wherein
   a first PWM application section is coupled to the first battery, and the first charge current is pulse-width modulated with a first temperature-dependent duty cycle (D1) based on the first temperature obtained by the first temperature monitoring device, and
   a second PWM application section is coupled to the second battery, and the second charge current is pulse-width modulated with a second temperature-dependent duty cycle (D2) based on the second temperature obtained by the second temperature monitoring device.

2. The battery charger for charging a plurality of batteries according to claim 1, wherein:
   the information processed by the feedback section comprises an indication of charge complete when:
   the first charge current through the first battery decreases to a first predetermined charge current threshold, and
   the second charge current through the second battery decreases to a second predetermined charge current threshold; and the controller turns off the source current based on the indication of charge complete.

3. The battery charger for charging a plurality of batteries according to claim 2, wherein:
the first bypass section reduces the first clamp voltage by a first predetermined voltage amount when the first charge current decreases to a first predetermined current amount; and
the second bypass section reduces the second clamp voltage by a second predetermined voltage amount when the second charge current decreases to a second predetermined current amount.

4. The battery charger for charging a plurality of batteries according to claim 1, wherein
the feedback section processes first information regarding the first charge current from the first sense section at predetermined time intervals and second information regarding the second charge current from the second sense section at the predetermined time intervals; and
the controller receives the first and second information and reduces the source current to the largest amount of charge current needed by any one of the batteries at each of the predetermined time intervals, until the largest amount of charge current needed by any one of the batteries decreases to a predetermined charge current threshold.

5. The battery charger for charging a plurality of batteries according to claim 4, wherein the controller reduces the source current to the largest amount of charge current at each of the predetermined time intervals by reducing the source current down until the diverted current in at least one of the bypass sections is detected to have reached a predetermined diverted current threshold.

6. The battery charger for charging a plurality of batteries according to claim 1,
wherein
the plurality of PWM application sections are each respectively integral to the plurality of bypass sections.

7. The battery charger for charging a plurality of batteries according to claim 1, wherein:
the first charge current is pulse-width modulated such that D1=1 when the first temperature is less than a first predetermined value and D1≠1 when the first temperature is greater than or equal to the first predetermined value; and
the second charge current is pulse-width modulated such that D2=1 when the second temperature is less than a second predetermined value and D2≠1 when the second temperature is greater than or equal to the second predetermined value.

8. The battery charger for charging a plurality of batteries according to claim 1, wherein the battery is a Lithium Sulfur battery.

9. A battery charger for charging a plurality of batteries, the battery charger comprising:
a current source for supplying a source current;
a plurality of bypass sections comprising first and second bypass sections;
a plurality of sense sections comprising first and second sense sections;
a feedback section for processing information from the plurality of sense sections; and
a controller for modifying the source current based on the information from the feedback section, wherein:
the first bypass section is adapted to couple to a first battery for diverting a first diverted current from the source current for clamping voltage across the first batter to a first clamp voltage;
the second bypass section is adapted to couple to a second battery for diverting a second diverted current from the source current;
for clamping voltage across the second battery to a second clamp voltage;
the first sense section is coupled to the first bypass section for determining at least one of the first diverted current and a first charge current coupled to the first battery; and
the second sense section is coupled to the second bypass section for determining at least one of the second diverted current and a second charge current coupled to the second battery;
a plurality of temperature monitoring devices, wherein a first temperature monitoring device monitors a first temperature of the first battery at first predetermined time intervals, and a second temperature monitoring device monitors a second temperature of the second battery at second predetermined time intervals;
a condition database for storing data including charge times and the temperatures; and
an interface port for retrieving the data for a user to monitor conditions of each of the batteries,
wherein a first charge time of the first battery is determined by detecting the time when the first charge current decreases to a first charge current threshold, and the second charge time of the second battery is determined by detecting the time when a second charge current decreases to a second charge current threshold.

10. The battery charger according to claim 9, further comprising:
a plurality of PWM application sections for applying Pulse Width Modulation (PWM), wherein the first charge current is pulse-width modulated with a first temperature-dependent duty cycle (D1) based on the first temperature obtained by the first temperature monitoring device, and the second charge current is pulse-width modulated with a second temperature-dependent duty cycle (D2) based on the second temperature obtained by the second temperature monitoring device.

11. A method for charging a plurality of batteries, the method comprising steps of:
supplying a source current;
clamping a voltage across a first battery to a first clamp voltage and a voltage across a second battery to a second clamp voltage;
diverting a first diverted current from the source current through a first bypass circuit, and a second diverted current from the source current through a second bypass circuit based on the clamping step;
analyzing at least one of the first diverted current and a first charge current coupled to the first battery, and at least one of the second diverted current and a second charge current coupled to the second battery;
modifying the source current based upon the analyzing step
monitoring a first temperature of the first battery at first predetermined time intervals, and a second temperature of the second battery at second predetermined time intervals; and applying Pulse Width Modulation (PWM) wherein the first charge current is pulse-width modulated with a first temperature-dependent duty cycle (D1) based on the first temperature obtained in the monitoring step, and the second charge current is pulse-width modulated with a second temperature-dependent duty cycle (D2) based on the second temperature obtained in the monitoring step.

12. The method for charging a plurality of batteries according to claim 11, wherein:
the analyzing step comprises a step of determining charge complete when the first charge current coupled to the first battery decreases to a first charge current threshold, and the second charge current coupled to the second battery decreases to a second charge current threshold; and
the modifying step comprises a step of turning off the source current based on the charge complete.

13. The method for charging a plurality of batteries according to claim 12, wherein the diverting step further comprises a step of diverting the first charge current through the first bypass circuit from the first battery when the first charge current decreases to a first predetermined current amount, and the second charge current through the second bypass circuit from the second battery when the second charge current decreases to a second predetermined current amount.

14. The method for charging a plurality of batteries according to claim 13, wherein in the diverting step the first predetermined current amount of the first charge current is diverted by reducing the first clamp voltage by a first predetermined voltage amount, and the second predetermined current amount of the second charge current is diverted by reducing the second clamp voltage by a second predetermined voltage amount.

15. The method for charging a plurality of batteries according to claim 11, wherein
the analyzing step comprises a step of determining the first charge current coupled to the first battery and the second charge current coupled to the second battery at predetermined time intervals, and
the modifying step comprises a step of reducing, based on the analyzing step, the source current to the largest amount of charge current needed by any one of the batteries at each of the predetermined time intervals, until the largest amount of charge current needed by any one of the batteries decreases to a predetermined charge current threshold.

16. The method for charging a plurality of batteries according to claim 15, wherein in the reducing step at each of the time intervals, the source current is reduced until the diverted current in at least one of the bypass circuits is detected to have reached a predetermined diverted current threshold in the analyzing step.

17. The method for charging a plurality of batteries according to claim 11, wherein in the applying step the first charge current is pulse-width modulated such that D1=1 when the first temperature is less than a first predetermined value and D1≠1 when the first temperature is greater than or equal to the first predetermined value, and the second charge current is pulse-width modulated such that D2=1 when the second temperature is less than a second predetermined value and D2≠1 when the second temperature is greater than or equal to the second predetermined value.

18. The method for charging a plurality of batteries according to claim 11, wherein the battery is a Lithium Sulfur battery.

19. A method for charging a plurality of batteries, comprising:
supplying a source current;
clamping a voltage across a first battery to a first clamp voltage and a voltage across a second battery to a second clamp voltage;
diverting a first diverted current from the source current through a first bypass circuit, and a second diverted current from the source current through a second bypass circuit based on the clamping the voltage;
analyzing at least one of the first diverted current and a first charge current coupled to the first battery, and at least one of the second diverted current and a second charge current coupled to the second battery;
monitoring a first temperature of the first battery at first predetermined time intervals and a second temperature of the second battery at second predetermined time intervals;
storing data including charge times and the temperatures; and
retrieving the data for a user to monitor conditions of each of the batteries, wherein
a first charge time of the first battery is determined by detecting the time when the first charge current decreases to a first predetermined charge current threshold in the analyzing, and
a second charge time of the second battery is determined by detecting the time when the second charge current decreases to a second predetermined charge current threshold in the analyzing.

20. The method for charging a plurality of batteries according to claim 19, further comprising:
applying Pulse Width Modulation (PWM) wherein the first charge current is pulse-width modulated with a first temperature-dependent duty cycle (D1) based on the first temperature obtained in the monitoring, and the second charge current is pulse-width modulated with a second temperature-dependent duty cycle (D2) based on the second temperature obtained in the monitoring.

21. A method for charging a plurality of batteries, the method comprising steps of:
supplying a source current;
clamping a voltage across a first battery to a first clamp voltage and a voltage across a second battery to a second clamp voltage;
diverting a first diverted current from the source current through a first bypass circuit, and a second diverted current from the source current through a second bypass circuit based on the clamping step;
analyzing at least one of the first diverted current and a first charge current coupled to the first battery, and at least one of the second diverted current and a second charge current coupled to the second battery;
modifying the source current based upon the analyzing step;
monitoring a first temperature of the first battery at first predetermined time intervals and a second temperature of the second battery at second predetermined time intervals;
storing data including charge times and the temperatures;
retrieving the data for a user to monitor conditions of each of the batteries, wherein a first charge time of the first battery is determined by detecting the time when the first charge current decreases to a first predetermined charge current threshold in the analyzing step, and a second charge time of the second battery is determined by detecting the time when the second charge current decreases to a second predetermined charge current threshold in the analyzing step; and applying Pulse Width Modulation (PWM) wherein the first charge current is pulse-width modulated with a first temperature-dependent duty cycle (D1) based on the first temperature obtained in the monitoring step, and the second charge current is pulse-width modulated with a second temperature-dependent duty cycle (D2) based on the second temperature obtained in the monitoring step.

* * * * *

UNITED STATES PATENT AND TRADEMARK OFFICE
CERTIFICATE OF CORRECTION

PATENT NO.        : 7,880,435 B2                                              Page 1 of 1
APPLICATION NO.   : 11/775030
DATED             : February 1, 2011
INVENTOR(S)       : Randolph A. Ibrahim It is certified that error appears in the above-identified patent and that said Letters Patent is hereby corrected as shown below:

In the Specification:

Column 4, line 24, please delete "159" and insert --150--.

Signed and Sealed this
Thirty-first Day of May, 2011

David J. Kappos
*Director of the United States Patent and Trademark Office*